United States Patent [19]

Smith

[11] 4,067,013

[45] Jan. 3, 1978

[54] AUTOMATIC THRESHOLDING AND REFERENCE CIRCUIT

[75] Inventor: Richard M. Smith, Ridgecrest, Calif.

[73] Assignee: The United States of America as represented by the Navy, Washington, D.C.

[21] Appl. No.: 741,261

[22] Filed: Nov. 12, 1976

[51] Int. Cl.² .................. G01S 9/42; G01S 7/34; H04B 1/12

[52] U.S. Cl. .................. 343/7.7; 343/17.1 R; 325/474

[58] Field of Search .................. 343/7 A, 7.7, 17.1 R; 340/15.5 A, 15.5 AP, 15.5 AC, 15.5 BH; 325/474, 477

[56] References Cited

U.S. PATENT DOCUMENTS

| | | | |
|---|---|---|---|
| 2,871,468 | 1/1959 | Smith | 343/7.7 |
| 3,437,834 | 4/1969 | Schwartz | 340/15.5 A |
| 3,465,336 | 9/1969 | Fishbein et al. | 343/7 A X |
| 3,744,015 | 7/1973 | Marimon et al. | 325/474 |

Primary Examiner—Maynard R. Wilbur
Assistant Examiner—Lawrence Goodwin
Attorney, Agent, or Firm—R. S. Sciascia; Roy Miller

[57] ABSTRACT

An automatic thresholding reference and detection circuit which generates a signal in time which is a replica of the radar return signal's doppler spectrum. The radar signal return is processed by a target signal channel having a narrow bandwidth filter which produces a fine resolution replica of the signal spectrum, and by a reference signal channel having a wider bandwidth filter, which produces a smeared (or average) replica of the signal spectrum. The output of the reference signal channel is a threshold signal which, when compared to the output of the target signal channel, allows only the target signals to be passed for further processing and rejects clutter and thermal noise.

9 Claims, 8 Drawing Figures

AUTOMATIC THRESHOLDING AND REFERENCE CIRCUIT

BACKGROUND OF THE INVENTION

The present invention relates to Doppler radar systems, and more particularly to an automatic thresholding circuit for Doppler radar systems.

The type of target to be tracked by a system which incorporates this invention has a "line-like" Doppler frequency spectrum. For example, for aircraft targets, the energy of the target returns is divided between the skin line and a series of upper and lower sideband lines generated by engine modulations. These upper and lower sideband lines may have more amplitude, for short periods, than the skin line.

One way of suppressing false alarms is to employ some type of automatic thresholding. Automatic thresholding in pulse doppler radars is done in several ways. One of the most common methods is to provide a bank of doppler filters to cover the frequencies between the pulse repetition frequency (PRF) lines. Detectors follow each doppler filter. The signal levels are compared against a threshold. If the signal level is greater than the threshold then the signal is detected. This threshold level can be generated by averaging the total power in the pass band between the PRF lines or by averaging noise power for a subgroup of the doppler filters.

Another common method uses returns from neighboring range bins about the range bin to be examined. These returns are processed individually as in the previous method and then added to form a threshold.

These methods are practical where component and processing complexity can be tolerated. Depending upon the actual implementation, these thresholding methods may not be very sensitive to variations in noise power in the intra PRF line frequency region caused by clutter and transmitter noise.

SUMMARY OF THE INVENTION

Accordingly, the present invention provides two parallel processing channels — a target signal channel and a reference signal channel to provide automatic thresholding and detection. After range gating, the received return signal spectrum is shifted to a low frequency in a mixer. The doppler frequency region of interest within the return spectrum between two PRF lines is passed through a doppler band pass filter. The doppler frequencies are then converted to time signal replicas of the spectrum by two parallel signal channels. The parallel signal channels contain mixers, narrow band pass filters, fullwave envelope detectors and an envelope filter.

The bandwidth of the narrowband filter for the reference signal channel is wider than that for the target signal channel to provide an average reference value. The VCO for the reference signal channel is offset from that of the target signal channel to compensate for the different rise times of the two different narrow bandwidth filters. The VCO offset allows for centering the fine resolution time replica of the signal spectrum with that of the coarser replica used for reference.

The output of the two channels is compared and the target signals are passed for further processing.

DESCRIPTION OF THE PREFERRED EMBODIMENT

Figure 1:
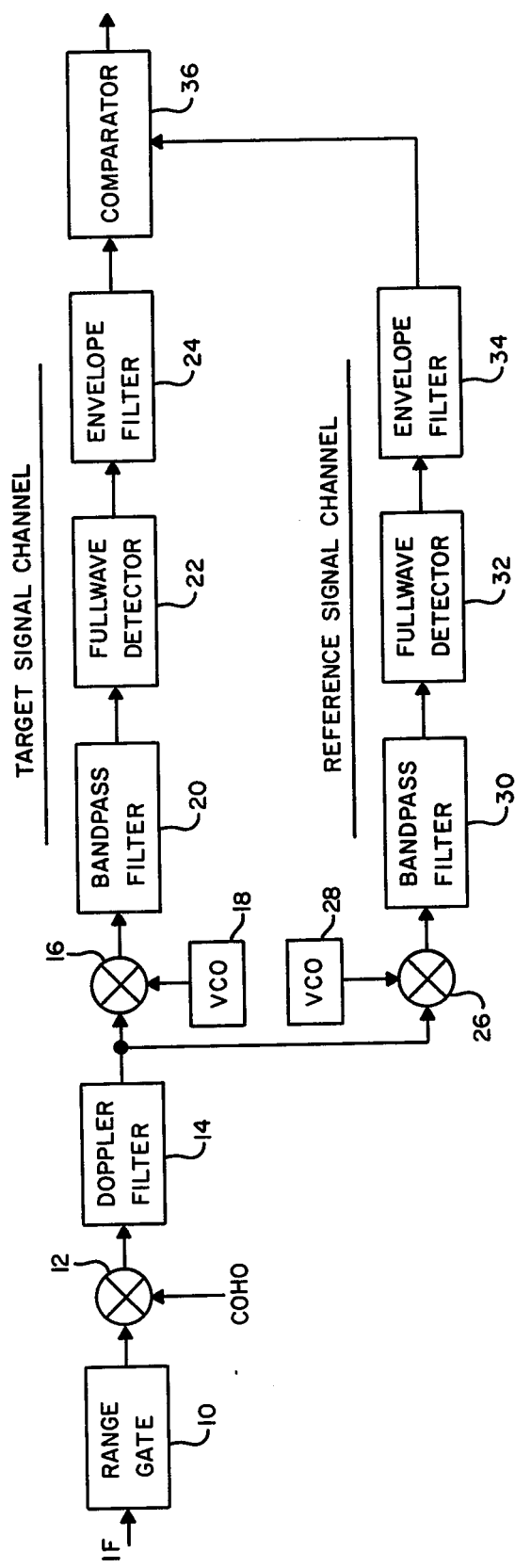
FIG. 1 is a block diagram of the present invention.

Referring now to FIG. 1, an IF output signal from a pulse doppler radar is fed to a range gate 10. From the range gate 10 the signal is down-translated in frequency by mixing the output of the range gate with the output of a coherent oscillator (COHO) in a mixer 12. The output of the mixer 12 is then inputted to doppler filter 14 which passes only the frequency region of interest between two PRF lines. The signal from the doppler filter 14 is then fed as one input to another pair of mixers 16, 26. A pair of voltage controlled oscillators (VCO) 18, 28 drive mixers 16, 26 respectively, with a linearly swept frequency in time.

The output from the doppler filter 14 interacts with the outputs of the VCO's 18 and 28 in the respective mixers 16, 26 to shift the doppler signal spectrum in time. The output of the mixers 16, 26 is then coupled through narrow bandpass filters 20, 30 with the respective bandwidths of the filters centered at the same frequency. The bandwidth of the filter 30 in the reference signal channel is wider than that of filter 20 in the target signal channel.

The respective signals, target and reference, are then processed by full-wave detectors 22, 32 and envelope filters 24, 34. The outputs of the two envelope filters 24, 34 provide the replica of the envelope of the signal spectrum as a function of time. These two signals are then coupled to a comparator 36 where the reference signal acts as a threshold signal so that only target signals are passed for further processing.

Bandpass filters 30 and 20 have different rise times and compensation for this is provided by offsetting VCO 28.

Figure 2:
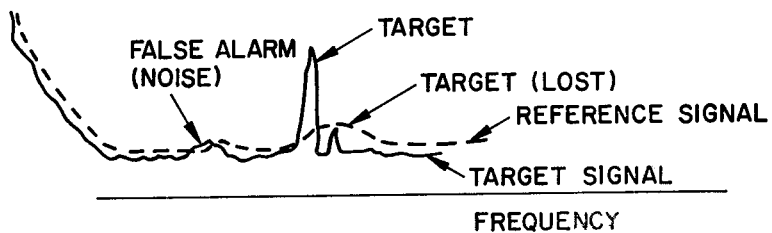
FIG. 2 is a diagram illustrating the effect upon the reference signal (a) without and (b) with an offset VCO in the reference signal channel.
Figure 2:
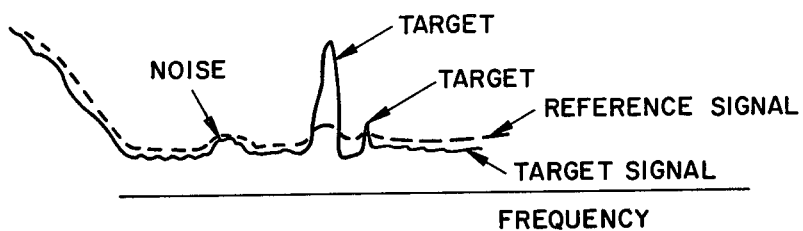

The effect of the offset VCO 28 is illustrated in FIG. 2. FIG. 2a illustrates that without the offset VCO, noise can be passed as a target, creating false alarms. Also, a low amplitude target signal next to a high amplitude target signal could be lost. Raising the reference level could reduce the false alarms, but sensitivity would be sacrificed. However, by offsetting VCO 28 the results of FIG. 2b are obtained, i.e., the noise is suppressed and the low amplitude target is detected without reducing sensitivity.

This method of providing automatic thresholding discriminates against non line-like spectrums. The narrow reference filter 30 provides an average reference signal over only a portion of the intra PRF line frequencies. This provides a better reference if the clutter and noise power changes significantly across the frequency band examined and allows a more sensitive signal to be detected.

The radar used in the present invention is coherent and the narrow filtering of the return spectrum can therefore provide processing gain. For example, if the PRF lines are separated by 50kHz and the effects of clutter are excluded, the signal-to-noise ratio, S/N, for the signal and noise energy between the PRF lines is the same as for the total signal. If the narrow bandpass filter 20 is placed over a target signal, all of the signal is passed and only a small portion of the noise. Increasing the S/N ratio in this way provides a processing gain increase on the order of approximately 18.8db in the present design.

Figure 3:
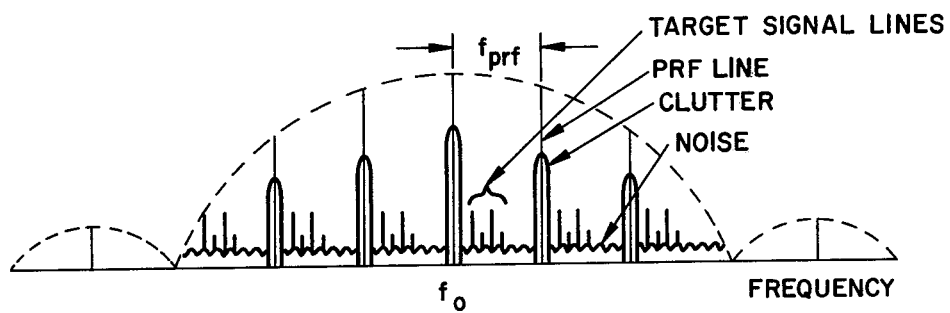
FIG. 3 is a diagram illustrating (a) the received return frequency spectrum and (b) the processed frequency spectrum.
Figure 3:
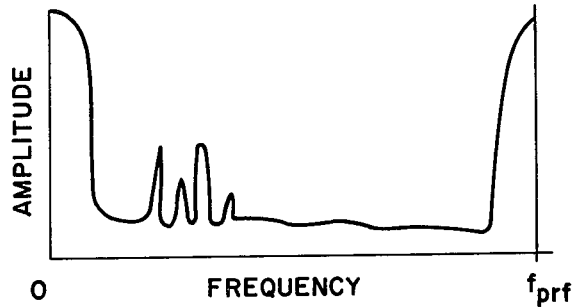

Referring now to FIG. 3a, a typical signal return spectrum is illustrated centered about the transmitter frequency, $f_0$. The return signal consists of a series of PRF lines with clutter roughly centered about them, and target signal lines between the PRF lines with a thermal noise background. If the range gate 10 moves off a target, the only change in the shape of the signal spectrum between the PRF lines is in amplitude. The range gated signals are mixed with a COHO signal to down-translate the frequency spectrum from the IF frequency to d.c. as shown in FIG. 3b.

The doppler filter 14 passes the signal frequencies between d.c. and the first PRF line and rejects the frequencies of the stationary clutter signals centered about the d.c. and PRF lines. Then the likely doppler target signal frequencies between d.c. and the first PRF line are searched for signal energy. This is accomplished by sweeping the signal spectrum past the narrow bandpass filter 20 fixed in frequency.

Figure 4:
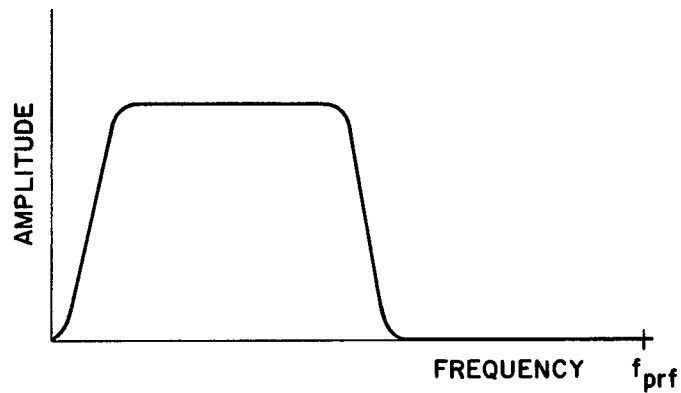
FIG. 4 is a diagram of the respective bandpass characteristics of (a) the doppler filter, (b) the target signal filter, and (c) the reference signal filter.
Figure 4:
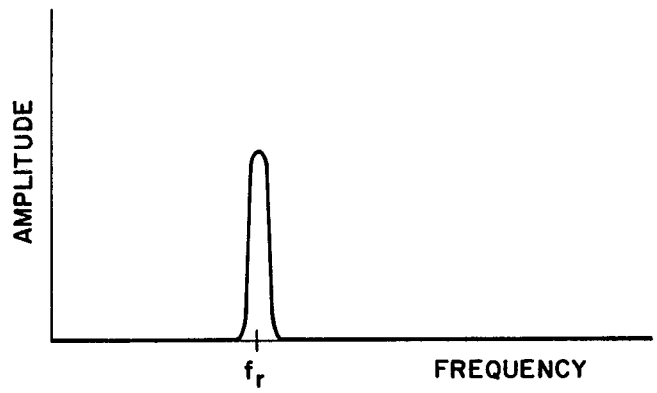
Figure 4:
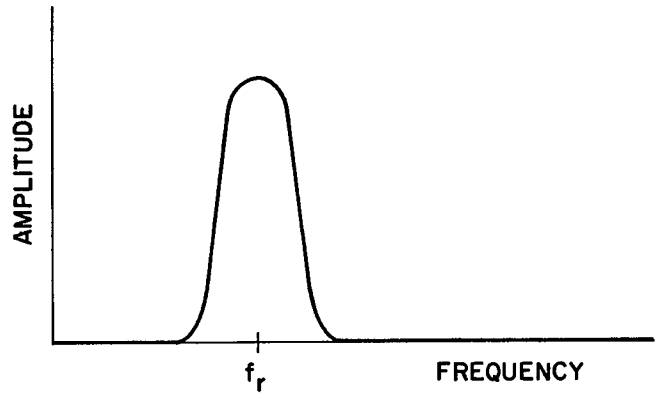

FIG. 4 shows the respective bandpass characteristics of the doppler filter 14 (FIG. 4a), the target signal narrow bandpass filter 20 (FIG. 4b), and the reference signal narrow bandpass filter (FIG. 4c) with typical bandwidths of 20kHz, 660Hz and 3KHz, respectively. The target signal filter 20 and the reference signal filter 30 have their respective bandwidths centered about frequency $f_r$.

The output of the doppler filter 14 is multiplied by the VCOs signals which are changing linearly in frequency. Since multiplication of time signals is equivalent to convolution in frequency, the signal spectrum slides through the narrow bandpass filters 20, 30 centered at $f_r$. The VCO sweep rate determines the bandwidth of the target signal filter 20 required to provide enough dwell time to accomodate the coherent integration of the target signal lines. The VCO signals are designed so that the spectrum shifted into the narrow bandpass filters 20, 30 stops just short of the shifted d.c. signal to provide further clutter attenuation.

The reference signal is derived from the doppler filter 14 to provide for the adaptive threshold to the comparator 36. The reference signal is centered with respect to the target signal to compensate for the difference in rise times of the reference signal filter 30 and target signal filter 20.

The comparator 36 controls a transmission gate which passes any signal which is of greater amplitude than the reference signal.

The present invention overcomes the slow time constants and resulting offset time response of narrow bandpass filters by using an offset VCO 30 in the reference signal channel, tracks changing noise levels within the doppler frequency spectrum of interest between two PRF lines, discriminates against detecting non line-like spectrums, and allows for simple mechanization.

What is claimed is:

1. An automatic, adaptive-threshold circuit for processing signals received from a pulse Doppler radar comprising:
    reception means for receiving a radar return signal from said pulse Doppler radar;
    a target channel connected to the output of said reception means, tuned to a first narrow bandwidth, and outputting a first time replica spectrum of said received output from said reception means;
    a reference channel connected to the output of said reception means and in parallel with said target channel, said reference channel tuned to a second narrow bandwidth wider than said first narrow bandwidth and outputting a second time replica spectrum of said received output from said reception means, said second time replica spectrum being coarser than said first time replica spectrum; and
    a comparator having a plurality of inputs connected to and receiving the outputs of said target channel and said reference channel, whereby said received radar return signal is processed in parallel fashion by said target and said reference channels, said reference channel output being the automatic, adaptive threshold against which said target channel output is compared in said comparator.

2. An automatic, adaptive threshold circuit as recited in claim 1 wherein said comparator controls a transmission gate which passes only that portion of the output of said target channel which is of greater amplitude than the output of said reference channel.

3. An automatic, adaptive threshold circuit as recited in claim 1 wherein said reception means includes:
    gating means connected to receive said radar return signal for range-gating said radar return signal;
    lowering means connected to the output of said gating means for down-translating in frequency the output of said gating means; and
    filter means connected to the output of said lowering means for selecting only the Doppler frequencies to be processed.

4. An automatic, adaptive threshold circuit as recited in claim 3 wherein said lowering means includes:
    a coherent oscillator having an output oscillation signal; and
    a first mixer having inputs connected to said gating means and said coherent oscillator and outputting a signal to said filter means.

5. An automatic, adaptive threshold circuit as recited in claim 1 wherein said target channel includes:
    a second mixer having a plurality of inputs, one of which is connected to the output of the aforesaid filter means;
    a first voltage-controlled oscillator having a frequency output swept linearly in time which is connected to another input of said second mixer;
    a first narrow-bandpass filter connected to the output of said second mixer for establishing said first narrow bandwidth;
    a first full-wave detector connected to the output of said first narrow-bandpass filter; and
    a first envelope detector connected to the output of said first full-wave detector, said first envelope detector outputting a signal to one input of the aforesaid comparator.

6. An automatic, adaptive threshold circuit as recited in claim 5 wherein said first narrow bandpass filter is fixed in frequency.

7. An automatic, adaptive threshold circuit as recited in claim 1 wherein said reference channel includes:
    a third mixer having a plurality of inputs, one of which is connected to the output of the aforesaid filter means;

a second voltage-controlled oscillator having a frequency output swept linearly in time which is connected to another input of said third mixer;

a second narrow-bandpass filter connected to the output of said third mixer for establishing said second narrow bandwidth, said second narrow bandwidth being wider than said first narrow bandwidth;

a second full-wave detector connected to the output of said second narrow-bandpass filter; and a second envelope detector connected to the output of said second full-wave detector, said second envelope detector outputting a signal to another input of the aforesaid comparator.

8. An automatic adaptive threshold circuit as recited in claim 7 wherein said second narrow-bandpass filter is fixed in frequency.

9. An automatic, adaptive threshold circuit as recited in claim 7 wherein said second voltage-controlled oscillator is offset in time from said first voltage-controlled oscillator.

* * * * *